(12) United States Patent
Kubo et al.

(10) Patent No.: US 7,153,609 B2
(45) Date of Patent: Dec. 26, 2006

(54) RECHARGEABLE BATTERY WITH NONAQUEOUS ELECTROLYTE

(75) Inventors: Kohichi Kubo, Kanagawa (JP); Hideyuki Kanai, Kanagawa (JP); Shuji Yamada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 514 days.

(21) Appl. No.: 10/234,163

(22) Filed: Sep. 5, 2002

(65) Prior Publication Data
US 2003/0054254 A1 Mar. 20, 2003

(30) Foreign Application Priority Data
Sep. 5, 2001 (JP) .............................. 2001-269021

(51) Int. Cl.
*H01M 4/64* (2006.01)

(52) U.S. Cl. ..................... 429/233; 429/235

(58) Field of Classification Search ................ 429/210, 429/231.95, 745, 730, 115, 233, 234, 129, 429/231.1, 231.3; 29/745, 730; 427/115
See application file for complete search history.

(56) References Cited

U.S. PATENT DOCUMENTS

| | | | |
|---|---|---|---|
| 6,730,440 B1 * | 5/2004 | Bauer et al. | 429/249 |
| 2001/0018147 A1 * | 8/2001 | Yanai et al. | 429/62 |
| 2003/0026037 A1 * | 2/2003 | O'Sullivan et al. | 360/97.01 |
| 2003/0099884 A1 * | 5/2003 | Chiang et al. | 429/233 |
| 2003/0186108 A1 * | 10/2003 | Jeon et al. | 429/40 |
| 2003/0203278 A1 * | 10/2003 | Hamada et al. | 429/156 |
| 2005/0026037 A1 | 2/2005 | Riley et al. | 429/210 |

FOREIGN PATENT DOCUMENTS

JP 7-249404 9/1995

* cited by examiner

*Primary Examiner*—Michael Barr
*Assistant Examiner*—Monique Wills
(74) *Attorney, Agent, or Firm*—Oblon, Spivak, McClelland, Maier & Neustadt, P.C.

(57) ABSTRACT

A rechargeable battery with a nonaqueous electrolyte using a constituent material, which has high energy density and a high level of safety. The constituent material includes a positive electrode having a lithium compound-containing active material and a current collector, and a negative electrode facing the positive electrode. The negative electrode an active material and a current collector. At least one of the current collectors being formed of an assembly of rectangular sheet pieces. The constituent material satisfies formula $S/\chi \leq \alpha \times d$, where d represents distance between the current collectors which face each other; S represents the largest facing area in one rectangular sheet piece in the positive electrode current collector and the negative electrode current collector; $\chi$ represents aspect ratio of one rectangular sheet piece in the positive electrode or negative electrode current collector; and $\alpha$ is a coeffieient which is a number of 900 to 720.

14 Claims, 5 Drawing Sheets

RECHARGEABLE BATTERY WITH NONAQUEOUS ELECTROLYTE

TECHNICAL FIELD

The present invention relates to a rechargeable battery and more particularly to a constituent material for a rechargeable battery with a nonaqueous electrolyte, comprising a positive electrode comprising a lithium-containing compound as an active material and a rechargeable battery with a nonaqueous electrolyte, comprising the constituent material.

CROSS-REFERENCE TO RELATED APPLICATIONS

This application is based upon and claims the benefit of priority from the prior Japanese Patent Applications No. 2001-269021, filed on Sep. 5, 2001; the entire contents of which are incorporated herein by reference.

BACKGROUND OF THE INVENTION

In recent years, attention has been drawn to rechargeable batteries with a nonaqueous electrolyte. This is considered attributable mainly to a success in the development of relatively safe negative electrode materials and to the realization of high-voltage batteries by virtue of an enhancement in decomposition voltage of nonaqueous electrolytes. Among the rechargeable batteries with a nonaqueous electrolyte, rechargeable batteries using lithium ions are promising batteries which can realize high-energy density batteries because of particularly high discharge potential. Further, in particular, putting large batteries typified by batteries for electric automobiles to practical use has recently become more and more expected. For such high-energy batteries as well, a further improvement in techniques for ensuring safety is necessary.

In order to realize high-capacitance or high-output batteries, ensuring safety upon internal shortcircuiting is important. Various experimental results, which have hitherto been carried out, show that ignition upon internal shortcircuiting possibly occurs through the following mechanism.

In the charged state, a voltage V of not less than 4 V is applied across the positive electrode and the negative electrode, and energy corresponding to the charge capacitance is stored between the positive electrode and the negative electrode. Regarding stored energy, however, the following energy should be further taken into consideration. The positive electrode current collector and the negative electrode current collector have a large area S and face each other while leaving a short distance d therebetween. A high-permittivity $\epsilon$ material (active material and electrolyte-impregnated separator) is inserted between the positive electrode current collector and the negative electrode current collector. Therefore, when both sides (top surface and back surface) are taken into consideration, energy $E$ ($=(1/2) \times C \times V^2$) as a capacitor with a capacitance $C$ ($=\epsilon = 2 \times S/d$) is included. When internal shortcircuiting occurs in this state, before the release of energy of the active material, electrons having high mobility accumulated within the current collector first flow and energy as a capacitor is released in a very short time. This energy density is generally considered to be higher than energy density involved in subsequent discharge of the active material.

DISCLOSURE OF THE INVENTION

The present inventors have found that the safety of high-capacitance or high-output rechargeable batteries with a nonaqueous electrolyte can be ensured by limiting the initial energy release to a given value or less. Accordingly, the present invention provides a constituent material for a rechargeable battery with a nonaqueous electrolyte and a rechargeable battery with a nonaqueous electrolyte, using the constituent material, which has high energy density and a high level of safety.

The present invention may provide a constituent material or element for a rechargeable battery with a nonaqueous electrolyte, comprising: a positive electrode comprising a lithium compound-containing active material and a positive electrode current collector; and a negative electrode provided so as to face the positive electrode, said negative electrode comprising a negative electrode active material and a negative electrode current collector, at least one of the positive electrode current collector and the negative electrode current collector being formed of an assembly of rectangular sheet pieces, the constituent material for a rechargeable battery with a nonaqueous electrolyte satisfying formula $$S/\chi \leq \alpha \times d$$

wherein d represents distance (unit: cm) between the positive electrode current collector and the negative electrode current collector which face each other; S represents the largest facing area (unit: cm$^2$) in one rectangular sheet piece in the positive electrode current collector and the negative electrode current collector; $\chi$ represents aspect ratio of one rectangular sheet piece in the positive electrode current collector or the negative electrode current collector; and $\alpha$ is a coefficient which is a number of 900 to 720.

BEST MODE FOR CARRYING OUT THE INVENTION

The constituent material or element for a rechargeable battery with a nonaqueous electrolyte and the rechargeable battery with a nonaqueous electrolyte according to the present invention will be described based on one embodiment (a cylindrical rechargeable battery with a nonaqueous electrolyte) shown in FIG. 2.

Figure 1:
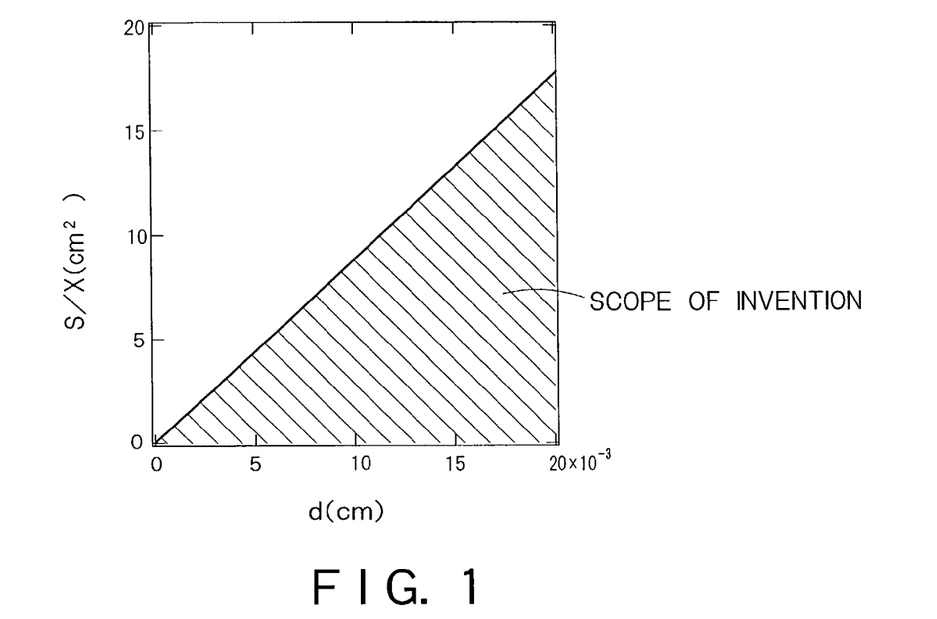
FIG. 1 is a diagram showing the scope of the present invention regarding S/$\chi$ (cm$^2$) and d (cm)
Figure 2:
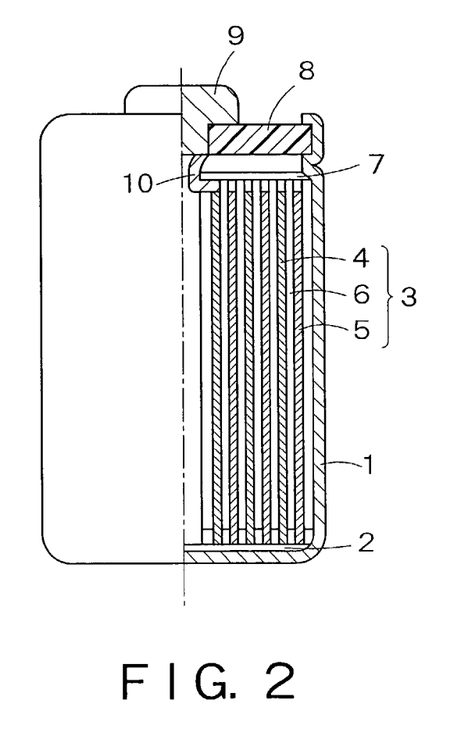
FIG. 2 is a typical view showing a rechargeable battery with a nonaqueous electrolyte according to an embodiment of the present invention.

In the cylindrical rechargeable battery with a nonaqueous electrolyte shown in FIG. 2, for example, an insulator 2 is disposed at the bottom of a closed-end cylindrical container 1 formed of stainless steel. A group of electrodes 3 are housed in the container 1.

The group of electrodes 3 have a structure such that a belt-like material, comprising a positive electrode 4, a separator 6, and a negative electrode 5 which have been stacked on top of another in that order, has been spirally wound so that the negative electrode 5 is located at the outer portion. The separator 6 is formed of a material, which is impregnatable with a nonaqueous electrolyte and is permeable to lithium ions, for example, a nonwoven fabric of a synthetic resin, a porous film of polyethylene, or a porous film of polypropylene.

A nonaqueous electrolyte is contained in the container 1. An insulating paper 7 having an opening in its center portion is mounted on the upper part of the group of electrodes 3 within the container 1. An insulation opening sealing plate 8 is disposed in the upper opening of the container 1, and the opening sealing plate 8 in its portion around the upper opening is caulked inward to fix the opening sealing plate 8 to be fluid-tightly fixed to the container 1. A positive electrode terminal 9 is fit into the center of the insulation opening sealing plate 8. One end of the positive electrode lead 10 is connected to the positive electrode 4, while the other end of the positive electrode lead is connected to the positive electrode terminal 9. The negative electrode 5 is connected to the container 1 as the negative terminal through a negative electrode lead (not shown).

Next, the construction of the positive electrode 4, the negative electrode 5, and the nonaqueous electrolyte will be described in more detail.

(1) Construction of Positive Electrode 4

The positive electrode 4 comprises a lithium compound-containing active material and a positive electrode current collector. Here "comprises" means a positive electrode consisting of the lithium compound-containing active material and the positive electrode current collector alone, and, in addition, a positive electrode which, in addition to the above active material and the positive electrode current collector, further includes a third component or construction. Examples of the third component or construction include binders and conductive agents.

In the present invention, lithium compound-containing active materials include, for example, lithium-containing cobalt oxide ($LiCoO_2$), lithium-containing nickel oxide ($LiNiO_2$), lithium-containing manganese oxide ($LiMn_2O_4$), or a material wherein other element, preferably magnesium, aluminum, or other group 3d or 4d transition element, fluorine or the like) has been added to or partially substituted for the crystal of the above active material.

Preferred current collectors include aluminum foils, stainless steel foils, and titanium foils.

The positive electrode 4 may be prepared by suspending the above active material, together with a conductive agent, such as acetylene black, and a binder, in a suitable solvent, coating the suspension onto a current collector, and drying the coating to prepare a thin-sheet electrode. This thin-sheet electrode is often referred to as an "electrode sheet."

The binder is not particularly limited. Examples of binders usable herein include polytetrafluoroethylene (PTFE), polyvinylidene fluoride (PVDF), ethylene-propylene-diene copolymer (EPDM), and styrene-butadiene rubber (SBR). Preferred conductive agents usable herein include acetylene black and ketjen black.

In the present invention, at least one of the positive electrode current collector and the negative electrode current collector is formed of an assembly of rectangular sheet pieces. A representative example of the structure is one wherein the electrode sheet has been divided as shown, for example, in FIG. 3, 4, or 5, that is, an assembly of rectangular sheet pieces. The reason why only any one of the positive electrode current collector and the negative electrode current collector is divided is that, even when the other sheet faces a gap between the pieces of the one sheet, no problem occurs and that the division of any one electrode suffices for the circuit.

Figure 3:
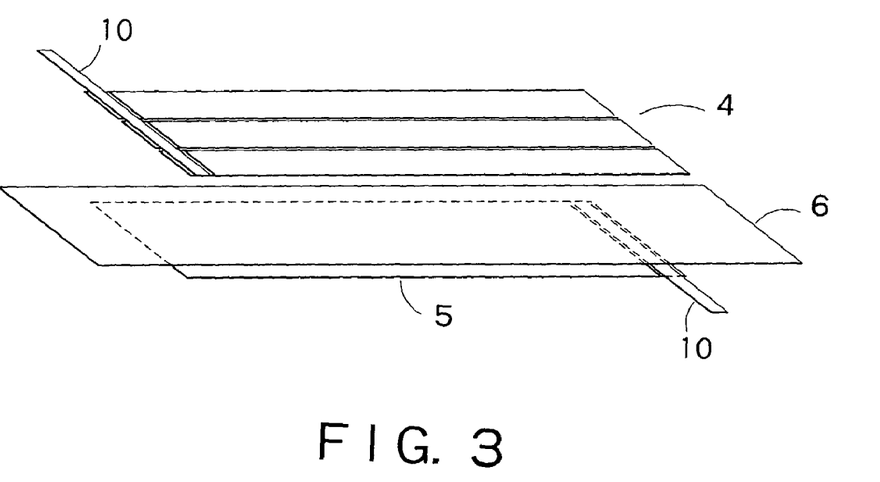
FIG. 3 is a typical view showing the structure (longitudinally divided form) of an electrode sheet used in a rechargeable battery with a nonaqueous electrolyte according to an embodiment of the present invention.

FIG. 3 shows an embodiment wherein cuts are provided parallel to the longitudinal direction of the sheet to prepare a plurality of divided strips, that is, rectangular sheet pieces, the strips, i.e., rectangular sheet pieces, are arranged so as not to come into contact with each other, and an electrode lead is welded to all the strips at the end of the electrode.

Figure 4:
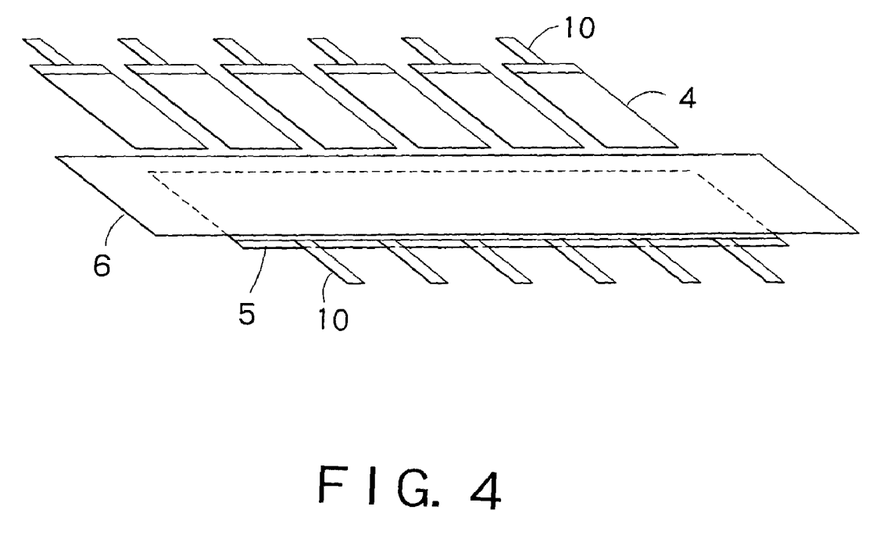
FIG. 4 is a typical view showing the structure (transversely divided form) of an electrode sheet used in a rechargeable battery with a nonaqueous electrolyte according to an embodiment of the present invention.

FIG. 4 shows an embodiment wherein cuts are provided in a direction perpendicular to the longitudinal direction to prepare a plurality of divided strips, that is, rectangular sheet pieces, and an electrode lead is welded to individual strips separately from each other.

Figure 5:
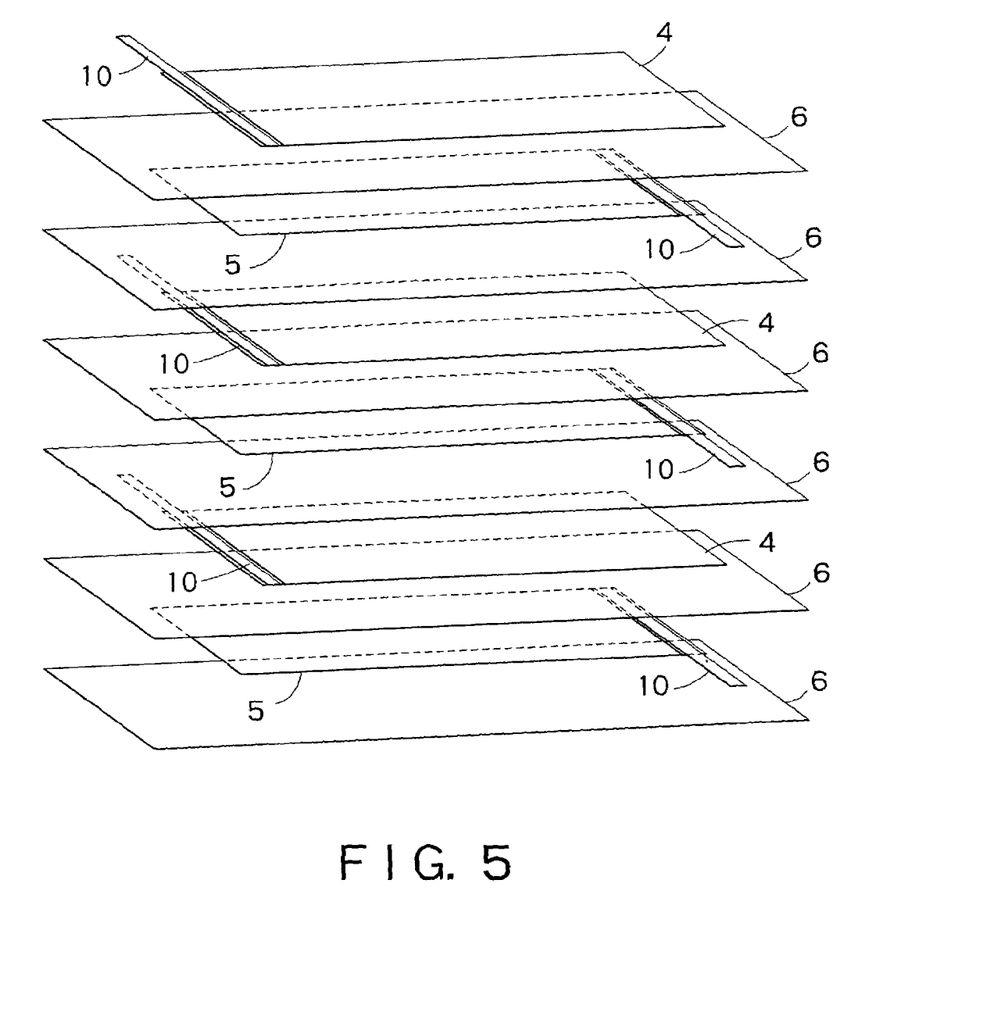
FIG. 5 is a typical view showing the structure (multilayered laminate structure) of an electrode sheet used in a rechargeable battery with a nonaqueous electrolyte according to an embodiment of the present invention.

FIG. 5 shows an embodiment wherein a plurality of sets of positive electrode/separator/negative electrode/separator are stacked on top of each other. Further, a combination of the above three embodiments is also possible.

Figure 8:
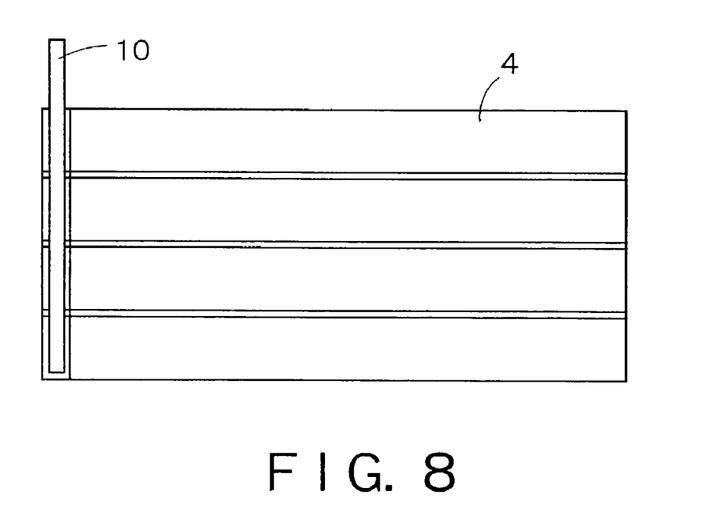
FIG. 8 is a typical view showing a positive electrode (divided into four parts) used in a rechargeable battery with a nonaqueous electrolyte according to an embodiment of the present invention.

The structure in the embodiment shown in FIG. 3 is suitable for relatively small batteries wherein a large number of electrode leads cannot be used, for example, cylindrical high-output batteries of model 18650. The structure in the embodiment shown in FIG. 4 or 5 is suitable for large batteries having a relatively large diameter. Further, a structure may also be adopted wherein, although the positive electrode sheet is apparently integral and is not different from the conventional positive electrode sheet, only the current collector per se is divided into the same pattern as shown in FIG. 3 or 4 and the boundary portion between regions is insulative (FIG. 8). Also in this case, even when a coating is present on the boundary portion between the regions within the current collector, the electrical resistance is satisfactorily high. Therefore, the same effect as attained in the embodiments shown in FIGS. 3 and 4 can be expected.

The constituent material for a rechargeable battery with a nonaqueous electrolyte according to the present invention satisfies formula:

$$S/\chi \leq \alpha \times d$$

wherein d represents distance (unit: cm) between the positive electrode current collector and the negative electrode current collector which face each other; S represents the largest facing area (unit: cm$^2$) in one rectangular sheet piece in the positive electrode current collector and the negative electrode current collector; $\chi$ represents aspect ratio of one rectangular sheet piece in the positive electrode current collector or the negative electrode current collector; and $\alpha$ is a coefficient which is a number of 900 to 720.

As will be described later, in the present invention, "rectangular sheet pieces" include those in a linear form such as linear wires.

The distance d between the positive electrode current collector and the negative electrode current collector, which face each other, is preferably 0.001 to 0.1 cm, particularly preferably 0.005 to 0.05 cm.

The facing area S between the positive electrode current collector and the negative electrode current collector is preferably 1 to 1000 cm$^2$, particularly preferably 10 to 100 cm$^2$.

The aspect ratio of one rectangular sheet piece in the positive electrode current collector or the negative electrode current collector is preferably 40:1 to 1000:1, particularly preferably 100:1 to 500:1.

The coefficient $\alpha$ is 900. When the aspect ratio of one rectangular sheet piece in the positive electrode current collector or the negative electrode current collector is 40:1 or less, the coefficient $\alpha'$ is preferably $0.8\alpha$, that is, 720.

Further, the additional use of a PTC element or an inductor (not less than 0.1 μH) according to need is considered advantageous for a further improvement in safety.

Here the reason why the current collector is in the form of an assembly of rectangular sheet pieces having an aspect ratio of 40:1 to 1000:1, in which the current direction at the time of discharging/charging is longitudinal, is as follows.

As the aspect ratio increases, the electrode sheet pieces as such function as an inductor at the time of flow of current and suppress a rapid current fluctuation. This prevents current concentration in a short time at the time of internal shortcircuiting. When the aspect ratio is excessively small, however, the inductance of the current path from the short-circuit point to another electrode sheet at the time of internal shortcircuiting is unsatisfactory and there is a fear that ignition occurs due to local Joule heat as a result of the temporary utmost current concentration.

S/$\chi$ is limited to not more than $\alpha \times d$ for limiting Joule heat which is generated immediately after internal shortcircuiting and is proportional to energy E $(=(\frac{1}{2}) \times C \times V^2)$ as a capacitor having a capacitance C $(=\epsilon \times 2 \times S/d)$.

S/$\chi$ is limited to not less than 0.1 cm$^2$. The reason for this is that the S/$\chi$ of 0.1 cm$^2$ suffices for satisfactory effect and a reduction in S/$\chi$ to less than 0.1 cm$^2$ provides no significant effect.

In the present invention, so far as the above requirements are satisfied, the rectangular sheet pieces may be a linear material which is long and narrow. In the case of the linear material, the constituent material according to the present invention is preferably formed of a fabric structure comprising conductive linear materials as the warp and insulating linear materials as the weft. The fabric structure can ensure insulation between conductive linear materials constituting the warp and, at the same time, can realize better mechanical strength and morphological stability of the current collector.

In the present invention, electrical connection of one end of the rectangular sheet pieces or the linear material to the lead is preferably carried out through a PTC element or a PTC resin. Here the PTC element/resin refers to a material that is known as an element/resin having positive temperature coefficient (PTC) function and is electrically conductive at room temperature and has high resistance at elevated temperatures.

Figure 9:
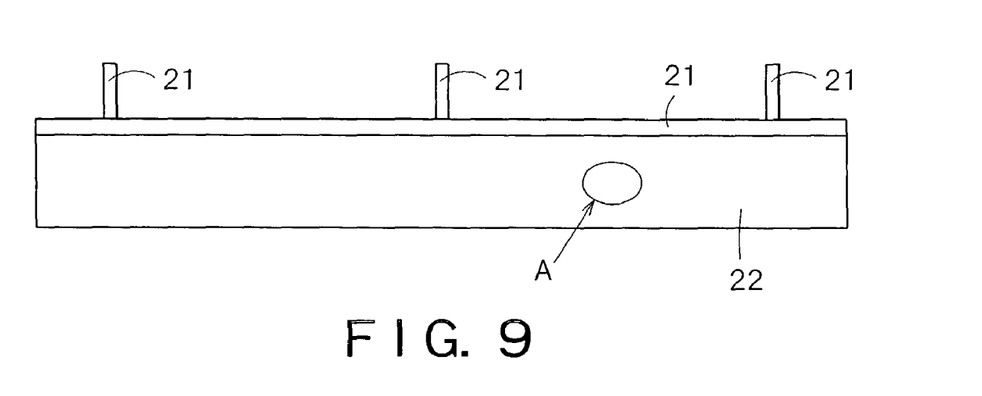
FIG. 9 is a typical view showing an embodiment of a negative electrode structure used in a rechargeable battery with a nonaqueous electrolyte according to the present invention.

FIG. 9 is a plan view showing an embodiment of a constituent material (current collector) according to the present invention having the above-described fabric structure. In this embodiment, the constituent material comprises, for example, a lead 21 formed of copper and a current collector 22 having a fabric structure. A predetermined negative electrode depolarizing mix layer (not shown) may be formed on the surface of the current collector 22.

Figure 10:
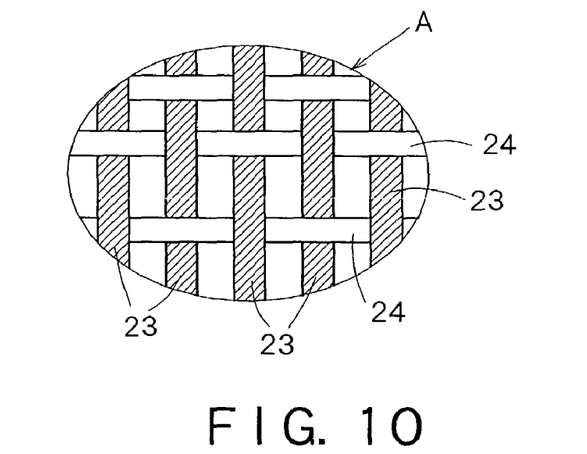
FIG. 10 is an enlarged view of part A in FIG. 9.

FIG. 10 is an enlarged view of the fabric structure in part A of FIG. 9. The fabric structure comprises linear materials 23 formed of a conductive material as the warp and linear materials 24 formed of an insulating material as the weft. One end of the linear materials 24 is electrically connected to the lead 21.

Figure 11:
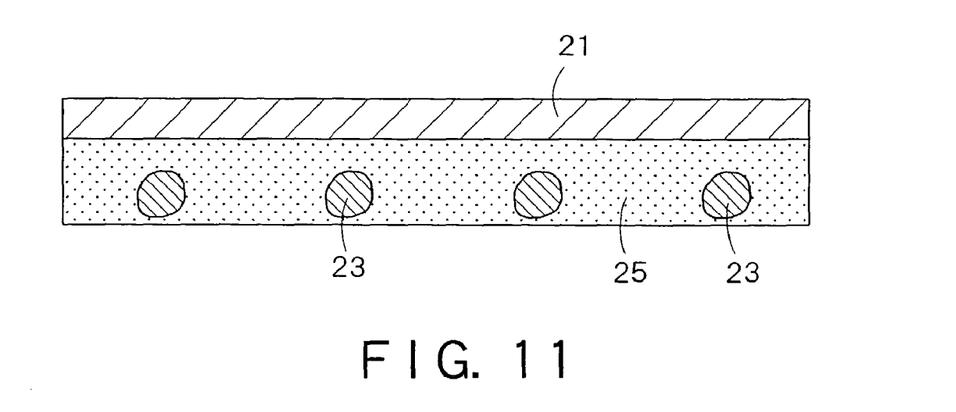
FIG. 11 is a typical cross-sectional view showing a junction structure between a negative electrode current collector and a copper lead used in a rechargeable battery with a nonaqueous electrolyte according to an embodiment of the present invention.

FIG. 11 is a cross-sectional view showing the state of electrical connection between one end of the linear materials 24 and the lead 21, wherein the end of each of the linear materials 23 formed of a conductive material is connected to the lead 21 through a PTC resin layer 25.

2) Construction of Negative Electrode 5

The negative electrode 5 comprises a negative electrode active material and a negative electrode current collector. Here "comprises" means a negative electrode consisting of the negative electrode active material and the negative electrode current collector alone, and, in addition, a negative electrode which, in addition to the above active material and the negative electrode current collector, further includes a third component or construction. Examples of the third component or construction include binders and conductive agents.

Examples of the negative electrode 5 include those comprising a material, which can occlude and devolatilize lithium ions, for example, carbonaceous materials or chalcogen compounds, and those formed of a light metal. Among them, a negative electrode comprising a carbonaceous material or a chalcogen compound, which can occlude and devolatilize lithium ions, is preferred from the viewpoint of improving battery characteristics, such as cycle life, of the rechargeable battery according to the present invention.

Carbonaceous materials, which can occlude and devolatilize lithium ions, include, for example, coke, carbon fibers, pyrolysis vapor growth carbonaceous materials, graphite, resin sintered products, and mesophase pitch carbon fiber or mesophase spherical carbon sintered products. Among them, mesophase pitch carbon fibers or mesophase spherical carbons, which have been graphitized at a temperature of 2500° C. or above, are particularly preferred because high electrode capacitance can be provided.

The carbonaceous material is particularly preferably such that, in a differential thermal analysis, an exothermic peak is preferably observed at a temperature of 700° C. or above, more preferably at a temperature of 800° C. or above, and the intensity ratio P101/P100 defined as the ratio of the intensity of a (101) diffraction peak (P101) to the intensity of a (100) diffraction peak (P100) in a graphite structure by X-ray diffraction analysis, is in the range of 0.7 to 2.2. Since this carbonaceous material-containing negative electrode can rapidly occlude and devolatilize lithium ions, the quick charge/discharge properties of the rechargeable battery according to the present invention can be significantly improved. Further, advantageously, the carbonaceous material-containing negative electrode can significantly reduce the possibility of inflammation of the negative electrode upon overheating.

Chalcogen compounds, which can occlude and devolatilize lithium ions, include titanium disulfide ($TiS_2$), molybdenum disulfide ($MOS_2$), and niobium selenide ($NbSe_2$). The use of these chalcogen compounds in the negative electrode can significantly increase the capacitance of the negative electrode although the voltage of the rechargeable battery is sometimes lowered. Therefore, the capacitance characteristics of the rechargeable battery can be improved. Further, in this negative electrode, the diffusion rate of lithium ions is so high that quick charge/discharge properties of the rechargeable battery can be improved.

Examples of preferred light metals include aluminum, aluminum alloys, magnesium alloys, lithium metal, and lithium alloys.

The negative electrode containing a material, which can occlude and devolatilize lithium ions, can be prepared, for example, by suspending the above-described negative electrode active material and binder in a suitable solvent, coating the suspension onto a current collector, drying the coating, and then pressing the coated current collector.

Binders usable herein include, for example, polytetrafluoroethylene (PTFE), polyvinylidene fluoride (PVDF), ethylene-propylene-diene copolymer (EPDM), styrene-butadiene rubber (SBR), and carboxymethylcellulose (CMC).

For example, copper foils, stainless steel foils, or nickel foils are preferably used as the negative electrode current collector.

3) Construction of Nonaqueous Electrolyte

The nonaqueous electrolyte is preferably a solution of an electrolyte (a lithium salt) in a nonaqueous solvent.

Specific examples of preferred nonaqueous solvents usable herein include (i) cyclic carbonates, for example, ethylene carbonate (EC) and propylene carbonate (PC), (ii) chain carbonates, for example, dimethyl carbonate (DMC), ethylmethyl carbonate (EMC), and diethyl carbonate (DEC), (iii) chain ethers, for example, dimethoxyethane (DME), diethoxyethane (DEE), and ethoxymethoxyethane, (iv) cyclic ethers, for example, tetrahydrofuran (THF) and 2-methyltetrahydrofuran (2-MeTHF), (v) fatty esters, for example, crown ethers and γ-butyrolactone (γ-BL), (vi) nitrogen compounds, for example, acetonitrile (AN), and (vii) sulfur compounds, for example, sulfolane (SL) and dimethyl sulfoxide (DMSO). The nonaqueous solvents may be used alone or as a mixture of two or more. Among them, a nonaqueous solvent composed of at least one member selected from EC, PC, and γ-BL or a mixed solvent composed of at least one member, selected from EC, PC, and γ-BL, with at least one member selected from DMC, EMC, DEC, DME, DEE, THF, 2-MeTHF, and AN is particularly preferred. When a material, that contains the carbonaceous material, which can occlude and devolatilize lithium ions, is used in the negative electrode, the use of a mixed solvent composed of EC, PC and γ-BL, a mixed solvent composed of EC, PC and EMC, a mixed solvent composed of EC, PC and DEC, a mixed solvent composed of EC, PC and DEE, a mixed solvent composed of EC and AN, a mixed solvent composed of EC and EMC, a mixed solvent composed of PC and DMC, a mixed solvent composed of PC and DEC, or a mixed solvent composed of EC and DEC is preferred from the viewpoint of improving the cycle life of the rechargeable battery provided with the negative electrode.

Preferred electrolytes include, for example, lithium salts such as lithium perchlorate ($LiClO_4$), lithium phosphate hexafluoride ($LiPF_6$), lithium borofluoride ($LiBF_4$), arsenic lithium hexafluoride ($LiAsF_6$), lithium trifluoromethanesulfonate ($LiCF_3SO_3$), and lithium bistrifluoromethylsulfonylimide [$LiN(CF_3SO_2)_2$]. Among them, $LiPF_6$, $LiBF_4$, and $LiN(CF_3SO_2)_2$ are preferred from the viewpoint of improving electrical conductivity and safety.

The amount of the electrolyte dissolved in the nonaqueous solvent is preferably in the range of 0.1 to 3.0 mol/liter.

For example, trimethyl phosphate (TMP), ethyldimethyl phosphate (EDMP), diethylmethyl phosphate (DEMP), or triethyl phosphate (TEP) may be added as a flame retardant from the viewpoint of further improving the safety. Further, the addition of vinylidene carbonate (VC) or, the like as a decomposition reaction inhibitor of these materials on the negative electrode is preferred.

EXAMPLES

Examples of the present invention will be described with reference to results shown in the accompanying drawings and the like.

The present invention, however, is not limited to these examples only, and variations and modifications may be properly employed without changing the subject matter of the present invention. In all the following examples and comparative examples, the length of the electrode is determined so as to conform to the size of a model 18650 battery.

Example 1

<Preparation of Positive Electrode>

Figure 6:
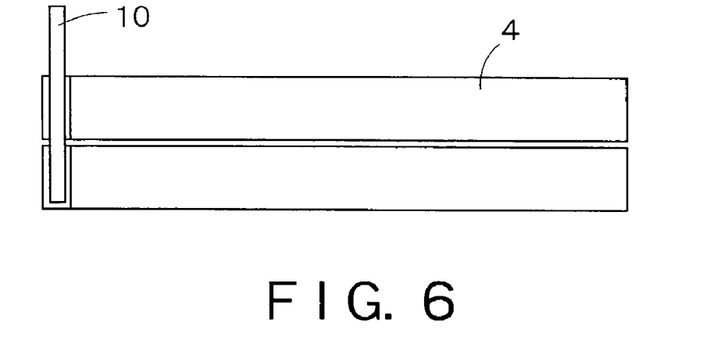
FIG. 6 is a typical view showing a positive electrode (divided into two parts) used in a rechargeable battery with a nonaqueous electrolyte according to an embodiment of the present invention.

An $Li_{1.075}Ni_{0.755}Co_{0.17}F_{0.1}$ powder as an active material was thoroughly ground while properly measuring grain size distribution with a grain size distribution meter and was continued to be ground until no agglomerate was present. The active material powder thus obtained, an acetylene black powder and a graphite powder as conductive agents, and PVDF as a binder were dispersed in N-methyl-2-pyrrolidone as a solvent to prepare a positive electrode depolarizing mix slurry. This slurry was coated onto an aluminum foil at a weight per unit area of 230 g/m², and the coating was dried. This was rolled and cut so that the electrode width was divided into two equal parts as shown in FIG. 6. Thus, a positive electrode sheet was prepared.

<Preparation of Negative Electrode>

A graphite powder as a negative electrode active material and a conductive agent and a styrene-butadiene rubber as a binder were mixed together at a suitable ratio. Water was added to the mixture, and the graphite powder and the styrene-butadiene rubber were thoroughly dispersed in water to prepare a negative electrode depolarizing mix slurry. The slurry was coated onto a copper foil, and the coating was dried, and the coated copper foil was then rolled and cut to prepare a negative electrode sheet.

<Preparation of Nonaqueous Electrolyte>

$LiPF_6$ as an electrolyte was dissolved to a concentration of 1 mol/liter in a solvent prepared by mixing ethylene carbonate and ethylmethyl carbonate at a volume ratio of 1:2 to prepare a nonaqueous electlyte.

<Preparation of Battery>

The positive electrode sheet, the negative electrode sheet, and a separator were satisfactorily dried, and two-divided positive electrode and negative electrode were then wound as shown in FIG. 6 so as to face each other through a separator, and this roll was inserted into a stainless steel battery can. An electrolysis solution (electrolyte) was poured into the battery can in an argon atmosphere, followed by hermetical sealing to prepare a battery for evaluation. In this battery, the weight per unit area (coating weight per unit area) of the negative electrode was varied according to the weight per unit area of the positive electrode.

Example 2

A battery was assembled in the same manner as in Example 1, except that the weight of the slurry per unit area in the positive electrode was 180 g/m² and the area per positive electrode piece was 125 m².

Example 3

Figure 7:
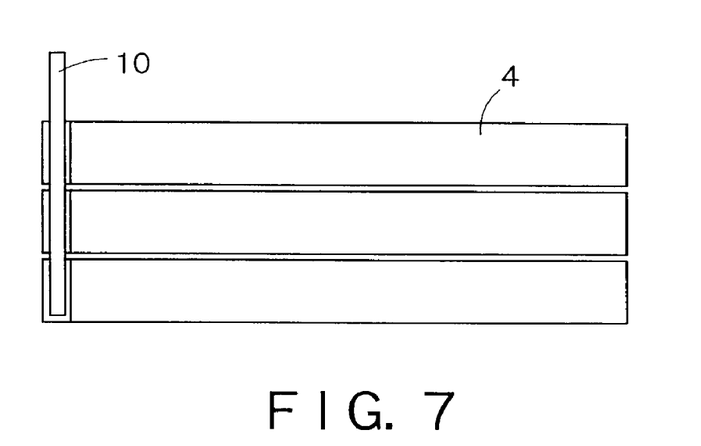
FIG. 7 is a typical view showing a positive electrode (divided into three parts) used in a rechargeable battery with a nonaqueous electrolyte according to an embodiment of the present invention.

A battery was assembled in the same manner as in Example 1, except that the positive electrode width was cut into three equal parts (see FIG. 7).

Example 4

A battery was assembled in the same manner as in Example 3, except that the weight of the slurry per unit area in the positive electrode was 180 g/m².

Example 5

A battery was assembled in the same manner as in Example 3, except that the weight of the slurry per unit area in the positive electrode was 100 g/m².

Example 6

A polyethylene or polyimide tape having a width of about 2 mm was applied to one side of a current collector so that four parts were provided parallel to one another at equal intervals. A portion in a width of about 100 µm to 1 mm around the center line of the tape was then etched with dilute hydrochloric acid (pH=3 to 5) from the opposite side. A battery was assembled in the same manner as in Example 3, except that the positive electrode was divided into four equal parts in the widthwise direction in this way and a positive electrode material was coated thereon (see FIG. 8) at a weight per unit area of 100 g/m².

Example 7

A battery was assembled in the same manner as in Example 6, except that the weight of the slurry per unit area in the positive electrode was 80 g/m².

Example 8

A battery was assembled in the same manner as in Example 7, except that the number of parts, into which the positive electrode was divided, was 20.

Example 9

A battery was assembled in the same manner as in Example 1, except that the positive electrode was not divided while the negative electrode was divided into two parts.

Example 10

A current collector having a construction as shown in FIG. 9 was prepared. In this case, as shown in FIG. 10, a fabric using a copper wire (30 mmφ) as the warp and a polyester wire (30 µmφ) as the weft was used as the current collector in the positive electrode. A large battery having a capacitance of 12 Ah was assembled using this current collector. The assembling of the battery was carried out in the same manner as in Example 1, except that, as shown in FIG. 11, a copper ribbon was joined to the end of the current collector so that the copper wires within the current collector were connected to one another while interposing a resin having PTC (positive temperature coefficient) function between the copper ribbon and the copper wire.

Comparative Example 1

A battery was assembled in the same manner as in Example 1, except that the electrode width in the positive electrode was not divided and the electrode form was as a conventional one.

Comparative Example 2

A battery was assembled in the same manner as in Example 1, except that the weight of the slurry per unit area in the positive electrode was 230 g/m² and two electrode groups, in which the vertical length of the electrode was half, were stacked on top of each other.

Comparative Example 3

A battery was assembled in the same manner as in Comparative Example 1, except that the weight of the slurry per unit area in the positive electrode was 180 g/m².

Comparative Example 4

A battery was assembled in the same manner as in Example 1, except that the weight of the slurry per unit area in the positive electrode was 100 g/m².

Comparative Example 5

A battery was assembled in the same manner as in Comparative Example 4, except that three electrode groups, in which the vertical length of the electrode was one-third, were stacked on top of one another.

Reference Example

A battery was assembled in the same manner as in Example 10, except that the current collector was welded directly to the copper ribbon.

For the batteries prepared in Examples 1 to 10, Comparative Examples 1 to 5, and Reference Example, a charge operation was carried out in such a manner that, after the voltage value reached 4.4 V at a current value of 0.5C, current was continuously flowed so as to maintain the voltage and, as soon as the total charge time reached 5 hr, the flow of current was stopped.

The safety of each battery was evaluated as follows. Specifically, a nail was driven from the side of the charged battery, and the state of the battery was observed as follows.

The battery was laid and, in this state, was fixed to a pressing machine with a nail mounted on the upper part thereof. A current lead and a voltage monitor lead were mounted on the positive electrode and the negative electrode, and a thermocouple was mounted on a portion around the center of the side face of the battery.

The nail was allowed to descend to a portion deviated from the thermocouple provided around the center of the side face of the battery while monitoring the temperature and the voltage, and was put into and passed through the battery. The traveling speed of the nail was 110 mm/sec, and the diameter of the nail (stainless steel) was 2.5 mm for Examples 1 to 9 and Comparative Examples 1 to 5 and was 5 mm for the other cases.

At the same time, the cycle characteristics of the batteries prepared in the same manner as described above were measured as follows.

In charging, current was allowed to flow at 1C (rated capacity of battery per hr) until the voltage reached 4.2 V. Thereafter, current was allowed to flow while maintaining the voltage at 4.2 V. As soon as the total charge time reached three hr, the charge operation was stopped. A cessation time of 30 min was then provided, and discharge was then carried out. In the discharge, current was allowed to flow at 1C until the voltage reached 2.7 V. As soon as the voltage reached 2.7 V, the discharge operation was stopped. A cessation time of 30 min was then provided. Thereafter, in the same manner as described above, the charge operation and the discharge operation were repeated, and the discharge capacity was recorded.

The results are shown in Table 1 below.

the electrode was divided or are unsatisfactory in aspect ratio $\chi$ ($\geqq 1$) of each sheet piece in the current collector, burst and ignition occurred. Also for the battery prepared in Reference Example, ignition occurred.

It was found that a battery wherein a positive electrode material was coated onto a joined product prepared by previously connecting the current collector through a polymer neither has a problem of safety nor has a problem of cycle characteristics.

As a result of overall evaluation, it was found that all the batteries of the examples of the present invention are much superior to those of the comparative examples. In the table, represents that the battery is evaluated as very good overall; represents that the battery is evaluated as good overall; represents that the battery is evaluated as fair overall; and x represents that the battery is evaluated as failure overall.

As is apparent from the foregoing detailed description, according to the constituent material for a rechargeable battery with a nonaqueous electrolyte and the rechargeable battery with a nonaqueous electrolyte according to the

TABLE 1

| | Weight per unit area in positive electrode, g/m$^2$ | Number of parts into which positive electrode has been divided | Electrode width, cm | S, cm$^2$ | x | S/$\chi$d, cm | Electrolyte | Results of nail piercing test (highest attainable temp.) | Cycle characteristics (retention after 500 cycles) | Overall evaluation |
|---|---|---|---|---|---|---|---|---|---|---|
| Ex. 1 | 230 | 2 | 2.7 | 115 | 15.8 | 364 | 1M LiPF$_6$/ (Ec:EMC = 1:2) | 110° C. | 94% | |
| Ex. 2 | 180 | 2 | 2.7 | 140 | 19.3 | 453 | 1M LiPF$_6$/ (EC:EMC = 1:2) | 108° C. | 95% | |
| Ex. 3 | 230 | 3 | 1.8 | 75 | 23.7 | 158 | 1M LiPF$_6$/ (EC:EMC = 1:2) | 113° C. | 94% | |
| Ex. 4 | 180 | 3 | 1.8 | 90 | 29.0 | 194 | 1M LiPF$_6$/ (EC:EMC = 1:2) | 111° C. | 94% | |
| Ex. 5 | 100 | 3 | 1.8 | 150 | 46.3 | 418 | 1M LiPF$_6$/ (EC:EMC = 1:2) | 115° C. | 96% | |
| Ex. 6 | 100 | 4 (Connected through polymer) | 1.4 | 116 | 62.2 | 200 | 1M LiPF$_6$/ (EC:EMC = 1:2) | 114° C. | 95% | |
| Ex. 7 | 80 | 4 (Connected through polymer) | 1.4 | 134 | 71.3 | 233 | 1M LiPF$_6$/ (EC:EMC = 1:2) | 113° C. | 97% | |
| Ex. 8 | 80 | 20 | 0.27 | 26.7 | 356 | 9.34 | 1M LiPF$_6$/ (EC:EMC = 1:2) | 102° C. | 79% | |
| Ex. 9 | 230 | 2 (Number of parts into which negative electrode has been divided | 5.6 (Negative electrode) | 128 (Negative electrode) | 16.5 (Negative electrode) | 423 (Negative electrode) | 1M LiPF$_6$/ (EC:EMC = 1:2) | 114° C. | 93% | |
| Comp. Ex. 1 | 230 | 1 | 5.5 | 252 | 8.4 | 1630 | 1M LiPF$_6$/ (EC:EMC = 1:2) | Ignited 460° C. | 95% | x |
| Comp. Ex. 2 | 230 | 2 (Two electrode groups have been put on top of each other | 5.5 | 126 | 4.2 | 1630 | 1M LiPF$_6$/ (EC:EMC = 1:2) | Ignited 530° C. | 94% | x |
| Comp. Ex. 3 | 180 | 1 | 5.5 | 307 | 10.2 | 2007 | 1M LiPF$_6$/ (EC:EMC = 1:2) | Ignited 650° C. | 93% | x |
| Comp. Ex. 4 | 100 | 2 | 2.7 | 233 | 31.1 | 934 | 1M LiPF$_6$/ (EC:EMC = 1:2 | Ignited 430° C. | 95% | x |
| Comp. Ex. 5 | 100 | 3 (Three-layer structure) | 5.5 | 155 | 5.2 | 3187 | 1M LiPF$_6$/ (EC:ECM = 1:2) | Ignited 450° C. | 96% | x |

As is apparent from Table 1, the results of the nail piercing test demonstrate that all the batteries prepared in Examples 1 to 9 of the present invention are safe. For the battery prepared in Example 10, both the results of the nail piercing test and the cycle characteristics were good. On the other hand, for the batteries prepared in Comparative Examples 1 to 5 that are unsatisfactory in the number of parts into which present invention, when at least one of the positive electrode current collector and the negative electrode current collector is formed of an assembly of rectangular sheet pieces and, at the same time, the constituent material for a rechargeable battery with a nonaqueous electrolyte satisfies the above-defined specific formula, energy released at a time upon internal shortcircuiting is limited and the current collector per se functions as an inductor. This can suppress a rapid change in current and can ensure safety of batteries with high energy density at the time of internal shortcircuiting without the need to provide any special additional safety element.

The invention claimed is:

1. A constituent material for a rechargeable battery with a nonaqueous electrolyte, comprising:
    a positive electrode comprising a lithium compound-containing active material and a positive electrode current collector; and
    a negative electrode provided so as to face the positive electrode, said negative electrode comprising a negative electrode active material and a negative electrode current collector,
    at least one of the positive electrode current collector and the negative electrode current collector being formed of an assembly of plural rectangular sheet pieces, the constituent material for a rechargeable battery with a nonaqueous electrolyte satisfying formula $$S/\chi \leq \alpha \times d$$

wherein d represents distance (unit: cm) between the positive electrode current collector and the negative electrode current collector which face each other; S represents the largest facing area (unit: cm$^2$) in one rectangular sheet piece in the positive electrode current collector and the negative electrode current collector; $\chi$ represents aspect ratio (length/width) of one rectangular sheet piece in the positive electrode current collector or the negative electrode current collector; and $\alpha$ is a coefficient which is a number of 900 to 720.

2. The constituent material for a rechargeable battery with a nonaqueous electrolyte according to claim 1, wherein $S/\chi$ in the equation satisfies equation $$0.1 \leq S/\chi.$$

3. The constituent material for a rechargeable battery with a nonaqucous electrolyte according to claim 1 or 2, wherein the positive electrode current collector or the negative electrode current collector is formed of an assembly of rectangular sheet pieces in which the current direction at the time of discharging/charging is longitudinal.

4. The constituent material for a rechargeable battery with a nonaqueous electrolyte according to claim 3, wherein the positive electrode current collector or the negative electrode current collector is formed of an assembly of rectangular sheet pieces having an aspect ratio of 40:1 to 1000:1 in which the current direction at the time of discharging/charging is longitudinal.

5. The constituent material for a rechargeable battery with a nonaqueous electrolyte according to any one of claims 1 to 2, wherein, in the assembly of rectangular sheet pieces, the sheets are fixed to one another while maintaining the electrically insulated state between sheet pieces through an electrically insulating material.

6. The constituent material for a rechargeable battery with a nonaqueous electrolyte according to any one of claims 1 to 2, wherein the lithium compound-containing active material is a lithium-containing cobalt oxide (LiCoO$_2$), a lithium-containing nickel oxide (LiNiO$_2$), a lithium-containing manganese oxide (LiMn$_2$O$_4$), or a material wherein other element has been added to or partially substituted for the crystal of the active material.

7. The constituent material for a rechargeable battery with a nonaqueous electrolyte according to any one of claims 1 to 2, wherein the negative electrode active material is a carbonaceous material, a chalcogen compound, or a light metal which can occlude and devolatilize lithium ions.

8. The constituent material for a rechargeable battery with a nonaqueous electrolyte according to any one of claims 1 to 2, wherein the positive electrode current collector or the negative electrode current collector is formed of an aluminum foil, a stainless steel foil, or a titanium foil.

9. The constituent material for a rechargeable battery with a nonaqueous electrolyte according to claim 1, wherein the sheet pieces, constituting the current collector, at their one end are electrically connected to each other through a PTC element.

10. A rechargeable battery with a nonaqueous electrolyte, comprising the constituent material for a rechargeable battery with a nonaqueous electrolyte according to any one of claims 1 to 2 and a nonaqueous electrolyte.

11. A constituent material for a rechargeable battery with a nonaqueous electrolyte, comprising:
    a positive electrode comprising a lithium compound-containing active material and a positive electrode current collector; and
    a negative electrode provided so as to face the positive electrode, said negative electrode comprising a negative electrode active material and a negative electrode current collector, at least one of the positive electrode current collector and the negative electrode current collector being formed of an assembly of plural linear conductive materials, the constituent material for a rechargeable battery with a nonaqueous electrolyte satisfying formula $$S/\chi \alpha \times d$$

wherein d represents distance (unit: cm) between the positive electrode current collector and the negative electrode current collector which face each other; S represents the largest facing area (unit: cm$^2$) in one linear material in the positive electrode current collector and the negative electrode current collector; $\chi$ represents aspect ratio (length/width) of one linear material in the positive electrode current collector or the negative electrode current collector; and $\alpha$ is a coefficient which is a number of 900 to 720.

12. The constituent material for a rechargeable battery with a nonaqueous electrolyte according to claim 11, which is formed of a fabric structure comprising conductive linear materials as the warp and insulating linear materials as the weft.

13. The constituent material for a rechargeable battery with a nonaqueous electrolyte according to claim 12, wherein the linear materials, constituting the current collector, at their one end are electrically connected to each other through a PTC element.

14. A rechargeable battery with a nonaqueous electrolyte, comprising the constituent material for a rechargeable battery with a nonaqueous electrolyte according to any one of claims 11 to 13 and a nonaqueous electrolyte.

* * * * *